(12) United States Patent
Okada

(10) Patent No.: US 7,940,960 B2
(45) Date of Patent: May 10, 2011

(54) POSE ESTIMATING DEVICE AND POSE ESTIMATING METHOD

(75) Inventor: Ryuzo Okada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 796 days.

(21) Appl. No.: 11/924,194

(22) Filed: Oct. 25, 2007

(65) Prior Publication Data

US 2008/0152218 A1  Jun. 26, 2008

(30) Foreign Application Priority Data

Oct. 27, 2006  (JP) ................................ P2006-293138

(51) Int. Cl.
*G06K 9/00* (2006.01)
*G06F 15/18* (2006.01)

(52) U.S. Cl. ............................ 382/103; 382/155; 706/12

(58) Field of Classification Search .................. 382/103, 382/154–161; 706/12
See application file for complete search history.

(56) References Cited

U.S. PATENT DOCUMENTS

| 6,018,728 | A  | * | 1/2000  | Spence et al. ................ 706/20 |
| 6,144,755 | A  | * | 11/2000 | Niyogi et al. ................ 382/118 |
| 6,324,532 | B1 | * | 11/2001 | Spence et al. ................ 706/27 |
| 6,345,110 | B1 | * | 2/2002  | Niyogi et al. ................ 382/118 |
| 6,819,782 | B1 |   | 11/2004 | Imagawa et al. |
| 6,959,109 | B2 | * | 10/2005 | Moustafa ................ 382/159 |
| 7,233,931 | B2 | * | 6/2007  | Lee et al. ................ 706/12 |
| 2003/0235332 | A1 | * | 12/2003 | Moustafa ................ 382/157 |
| 2005/0144147 | A1 | * | 6/2005  | Lee et al. ................ 706/12 |
| 2006/0202986 | A1 | * | 9/2006  | Okada et al. |
| 2007/0019943 | A1 | * | 1/2007  | Sueyoshi et al. ................ 396/287 |
| 2007/0086660 | A1 | * | 4/2007  | Ai et al. ................ 382/226 |
| 2007/0214172 | A1 | * | 9/2007  | Nister et al. ................ 707/102 |
| 2007/0268295 | A1 |   | 11/2007 | Okada |
| 2008/0152218 | A1 | * | 6/2008  | Okada ................ 382/159 |
| 2010/0121794 | A1 | * | 5/2010  | Heisele et al. ................ 706/13 |
| 2010/0195867 | A1 | * | 8/2010  | Kipman et al. ................ 382/103 |
| 2010/0278384 | A1 | * | 11/2010 | Shotton et al. ................ 382/103 |
| 2010/0303289 | A1 | * | 12/2010 | Polzin et al. ................ 382/103 |

FOREIGN PATENT DOCUMENTS

| JP | 07-302341 | * | 11/1995 |
| JP | 2001-056861 | * | 2/2001 |

OTHER PUBLICATIONS

Tipping, Sparse Bayesian Learning and the Relevance Vector Machine, Journal of Machine Learning Research 1, 2001, pp. 211-244.
Dalal et al, Histograms of Oriented Gradients for Human Detection, Proc. of Computer Vision and Pattern Recognition, 2005, vol. 2, pp. 886-893.

(Continued)

*Primary Examiner* — Aaron W Carter
(74) *Attorney, Agent, or Firm* — Turocy & Watson, LLP

(57) ABSTRACT

A pose estimating device includes: a pose dictionary; an image feature extracting unit configured to extract observed image feature information; a past information storing unit configured to store past pose estimating information of the articulated object; a pose predicting unit configured to predict a present pose; a node predicting unit configured to calculate a prior probability as to whether each nodes includes a present pose; an identifying unit configured to calculate a likelihood of the observed image feature information for each node; a node probability calculating unit configured to calculate a probability in which the present pose belongs to the node in the upper layer; and a pose estimating unit configured to calculate pose information.

10 Claims, 5 Drawing Sheets

OTHER PUBLICATIONS

Agarwal et al, Recovering 3D Human Pose from Monocular Images, IEEE Transactions on Pattern Analysis and Machine Intelligence, 2006, vol. 28, No. 1.

Stenger et al, Filtering Using a Tree-Based Estimator, Proc. 9th IEEE International Conference on Computer Vision, 2003, vol. II, pp. 1063-1070.

* cited by examiner

POSE ESTIMATING DEVICE AND POSE ESTIMATING METHOD

CROSS-REFERENCE TO RELATED APPLICATIONS

This application is based upon and claims the benefit of priority from Japanese Patent Application No. 2006-293138, filed Oct. 27, 2006, the entire contents of which are incorporated herein by reference.

BACKGROUND OF THE INVENTION

1. Field

The present invention relates to a pose estimating device and a pose estimating method for an articulated object such as a human body based on an image obtained from a camera without requiring a marker.

2. Related Art

In JP-A2001-56861(KOKAI) and JP2627483 (J. OHYA), a silhouette of an articulated object is extracted and the observed silhouette and various silhouettes obtained from a three dimensional shape model are matched by using a genetic algorithm to estimate a pose. In such a direct matching method of the silhouette, the pose may not be possibly estimated in a stable way due to the difference in length, thickness, or surface form of links connecting joints between the three dimensional shape model and the articulated object to be recognized. For instance, when the pose of a human body is estimated, since a silhouette changes due to the difference of clothes, or the difference of a physique such as a height or a weight, even when a person to be recognized and the three dimensional shape model of a human body previously provided in the device have the same pose, these silhouettes are different. Thus, the pose cannot be correctly recognized.

In related art B. Stenger, A. Thayananthan, P. H. S. Torr, and R. Cipolla, "Filtering Using a Three-Based Estimator," In Proc. 9th IEEE International Conference on Computer Vision, Vol. II. Pages 1063-1070, 2003, relates a pose estimating method of a hand in which when a feature (edge) obtained from an image is matched with an image feature (outline) obtained from a three dimensional shape model of a hand having various poses to estimate a pose, a previously formed tree structure is used to carry out a search operation. However, outline information used herein is liable to be influenced by the difference of the length or thickness of links like silhouette information.

SUMMARY OF THE INVENTION

According to one embodiment of the present invention, there is provided a pose estimating device including: a pose dictionary that includes: training pose information related to various poses of an articulated object, a tree structure of poses that consists of layered nodes, wherein similarity among the training pose information belonging to a lower node is higher than similarity among the training pose information belonging to an upper node, a two-class discriminative function for each node in upper layers that is upper than the lowermost layer in the tree structure, which determines on the basis of the training pose information and training image feature information whether or not a pose represented by image feature information belongs to the respective node, where the training image feature information is obtained by capturing virtual images of the articulated object of various sizes and various surface shapes each relating to the learning pose information, and a mapping function for each node of the lowermost layer in the tree structure, which transforms image feature information into pose information on the basis of the training image feature information and the training pose information belonging to the nodes; an image feature extracting unit configured to extract observed image feature information from an image of the articulated object; a past information storing unit configured to store past pose estimating information of the articulated object; a pose predicting unit configured to predict a present pose on the basis of the past pose estimating information and a predetermined motion model; a node predicting unit configured to calculate a prior probability as to whether or not each nodes in respective layers of the tree structure includes a pose of a correct solution corresponding to the present pose based on the predicted pose; an identifying unit configured to calculate a likelihood of the observed image feature information for each node in the upper layer by using the two class discriminative function stored in the node; a node probability calculating unit configured to calculate a probability in which the pose of the correct solution is in the node in the upper layer from the prior probability and the likelihood; and a pose estimating unit configured to calculate pose information with respect to the lowermost layer by transforming the observed image feature information by the mapping functions stored in the pose dictionary.

According to another embodiment of the present invention, there is provided a pose estimating method using a pose dictionary, wherein the pose dictionary includes: training pose information related to various poses of an articulated object, a tree structure of poses that consists of layered nodes, wherein similarity among the training pose information belonging to a lower node is higher than similarity among the training pose information belonging to an upper node, a two-class discriminative function for each node in upper layers that is upper than the lowermost layer in the tree structure, which determines on the basis of the training pose information and training image feature information whether or not a pose represented by image feature information belongs to the respective node, where the training image feature information is obtained by capturing virtual images of the articulated object of various sizes and various surface shapes each relating to the learning pose information, and a mapping function for each node of the lowermost layer in the tree structure, which transforms image feature information into pose information on the basis of the training image feature information and the training pose information belonging to the nodes; the method comprising: setting up the pose dictionary; extracting observed image feature information from an image of the articulated object; storing past pose estimating information of the articulated object; predicting a present pose on the basis of the past pose estimating information and a predetermined motion model; calculating a prior probability as to whether or not each nodes in respective layers of the tree structure includes a pose of a correct solution corresponding to the present pose based on the predicted pose; calculating a likelihood of the observed image feature information for each node in the upper layer by using the two class discriminative function stored in the node; calculating a probability in which the pose of the correct solution is in the node in the upper layer from the prior probability and the likelihood; and calculating pose information with respect to the lowermost layer by transforming the observed image feature information by the mapping function stored in the pose dictionary.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION OF THE INVENTION

Now, a pose estimating device of an articulated object such as a human body of one embodiment of the present invention will be described by referring to FIGS. 1 to 5.

(1) Structure of Pose Estimating Device

Figure 1:
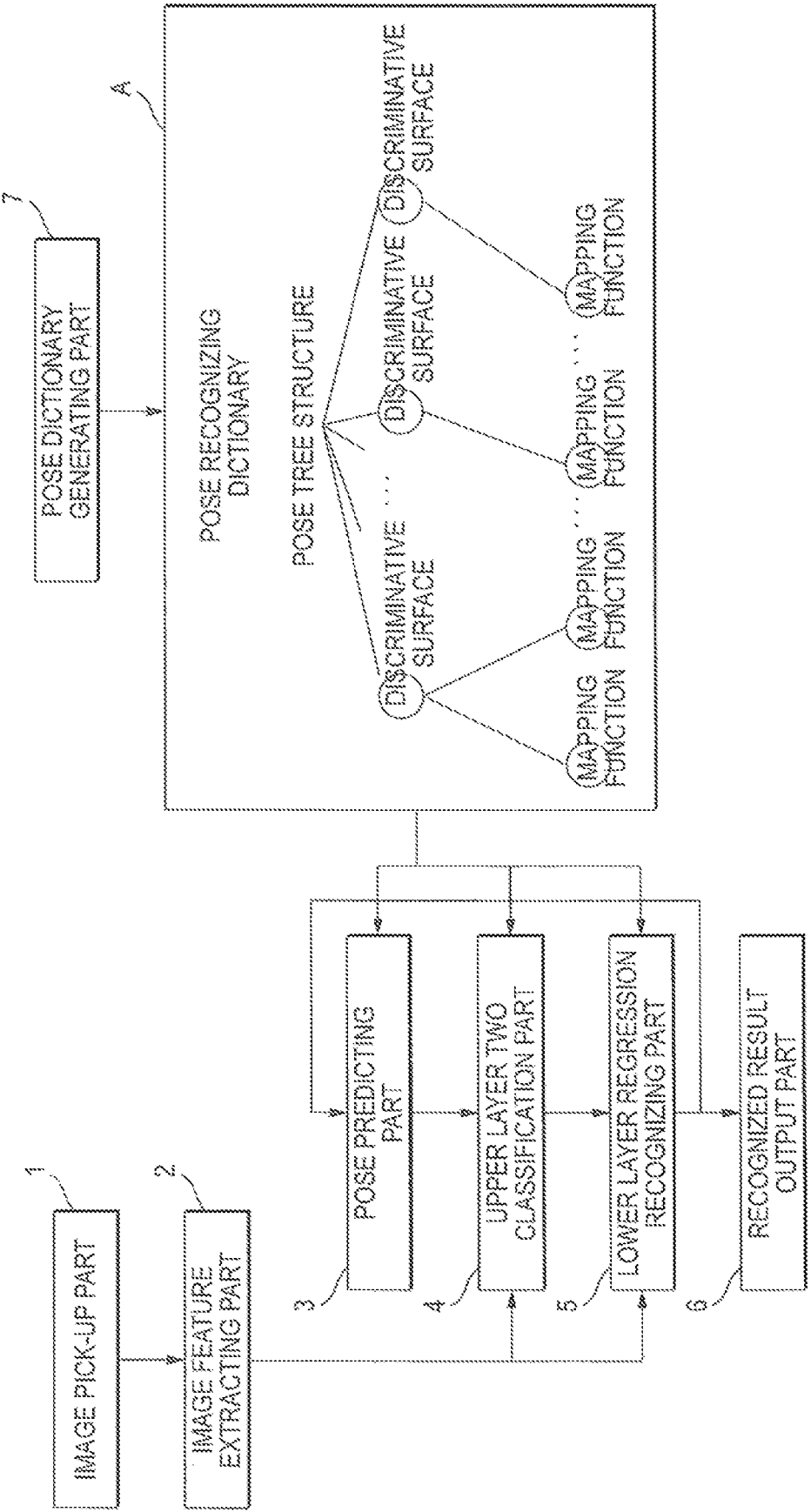
FIG. 1 is a block diagram showing the structure of a pose estimating device of a human body by an image according to one embodiment.

FIG. 1 is a block diagram showing the pose estimating device according to this embodiment.

The pose estimating device stores a pose dictionary A in which information related to various poses that is previously prepared before the pose is estimated is stored. In the pose dictionary A, are stored a pose tree structure formed on the basis of the similarity of the pose, a two class descriminative surface as an discriminative function for identifying two classes respectively for nodes of an upper layer of the pose tree structure and a mapping function to pose information from an image feature vector in which an image feature such as a silhouette or an edge extracted from an image in which the articulated object is projected is described by a vector for a lower layer of the pose tree structure.

Further, the pose estimating device includes an image pick-up part 1 for shooting an image, a image feature extracting part 2 for extracting an image feature such as a silhouette or an edge from the image obtained in the image pick-up part 1 and describing the image feature by a vector, a pose predicting part 3 for predicting a pose that may be taken in a present frame by using the estimated result of a previous frame and the information of the pose dictionary A, an upper layer classification part 4 for calculating a probability that a present pose belongs to nodes respectively by employing the two class discriminative surface of the upper layer of the pose tree structure stored in the pose dictionary A with the information of the predicted pose and the image feature extracted in the image feature extracting part 2, a lower layer regression part 5 for estimating the pose by employing the mapping function of the lower layer of the pose tree structure stored in the pose dictionary A with the result of the upper layer and the extracted image feature, and a recognized result output part 6 for generating and outputting pose information from a result of the lower layer regression part 5.

The lower layer means a lowermost layer of the tree structure and the upper layer means a layer higher than the lowermost layer.

(2) Dictionary Generating Part 7

Figure 2:
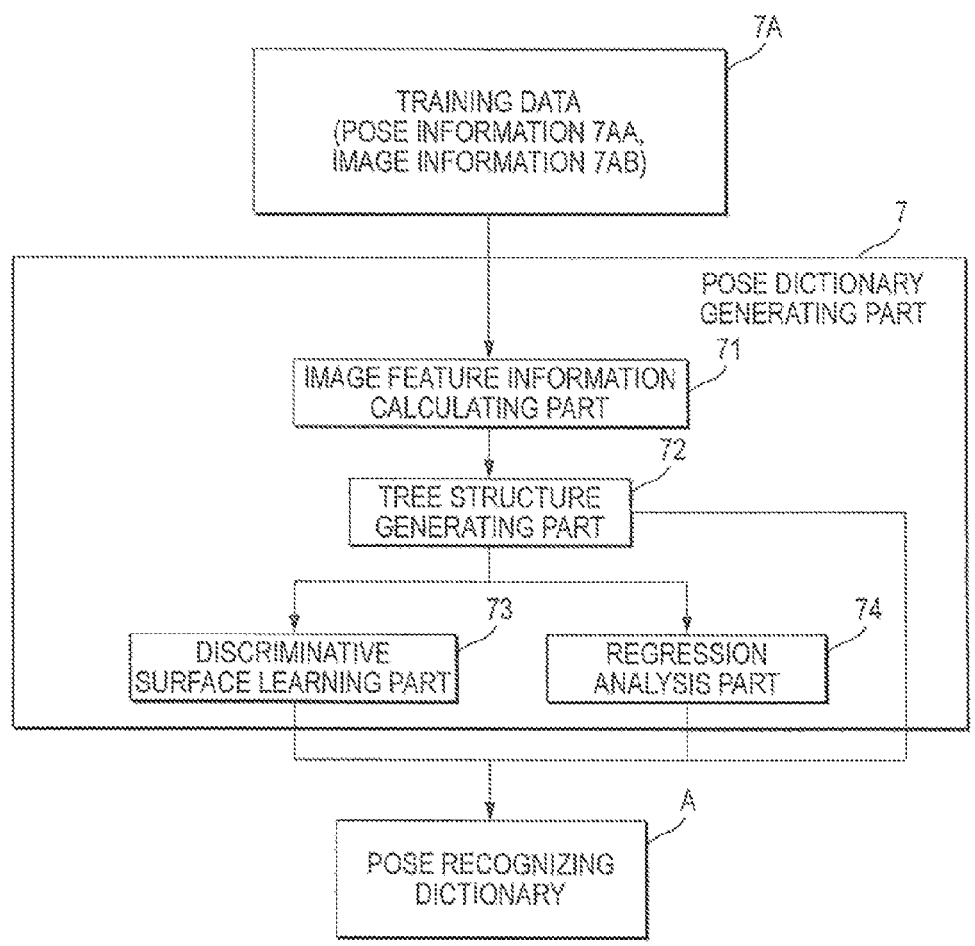
FIG. 2 is a block diagram showing the structure of a dictionary generating part.

FIG. 2 is a block diagram showing the structure of the dictionary generating part 7 for generating the pose dictionary A. A method for generating the pose dictionary A in the dictionary generating part 7 will be described below.

(2-1) Training Data 7A (2-1-1) Pose Information 7AA

Pose information 7AA is information related to angles or three dimensional positions of all articulations of the articulated object by which the pose of the articulated object can be exclusively determined. All links of the articulated object are described by a parent and child relation.

For instance, when the articulated object is a human body, the links are described in such a way that a three dimensional scene is considered to be a parent, a child thereof is considered to be a link of a waist, a child of the waist is considered to be a belly link and right and left thigh links and a child of the belly link is considered to be a breast link.

The poses of the links can be respectively represented by the differences of the angles from the parent link. That is, a conversion between a coordinate system fixed to a certain link and a coordinate system fixed to the parent link can be represented by three rotating angles rx, ry and rz (Eulerian angles) and a translation. Since the length of the links is ordinarily fixed, the transtation is constant. Thus, the pose of the certain link relative to the parent link can be determined only by the three rotating angles.

Assuming that the number of the articulations of the articulated object is Nb, the pose information can be expressed by a vector of 3×Nb dimensions like Xa={rx1, ry1, rz1, rx2, . . . , rz (Nb)}. This representation of Euler angle has a problem that the same pose can be described by an angle added by 360° in addition to the well known problem called Gimbal lock. For avoiding these problems, as well known, an articulate angle may be expressed by a quaternion. The pose can be also expressed by the three dimensional position of an articulation. A vector for describing the pose is referred to as a "pose vector", hereinafter.

The pose information 7AA indicates a set of pose vectors of various poses. As a method for obtaining the various poses, is exemplified a method for obtaining the various poses by actually moving the articulated object by the use of a general-purpose motion capture system, or a method for automatically generating the various poses by considering an operating range of the articulation of the articulated object or a collision with other parts. Further, when the rotating direction of the articulation of the articulated object is restricted or there is a strong correlation in the motions between the links, all the pose vectors may be dimensionally compressed by principal component analysis and the dimensionally compressed pose vectors may be used.

(2-1-2) Image Information 7AB

Image information 7AB indicates an image of the articulated object of various forms (the length and thickness of a link and a surface configuration) having the poses respectively represented by the pose vectors of the pose information 7AA.

Namely, a plurality of different images may exist for the same pose vector. A three dimensional model of the articulated object having the various surface configurations or the thickness and the length of the links between the articulations is deformed to various poses in a virtual space by using the pose vector and the deformed three dimensional model is virtually shot by a camera arranged in the virtual space that has the same parameters as those of a camera in a real space so that an image can be generated.

For instance, in the case of the human body, three dimensional human body models of various physiques or various clothes are deformed to various poses and shot by a virtually arranged camera, in other words, virtually projected on an image plane. The articulated object is projected so that the size of the articulated object on the image on which the articulated object is projected is equal on all the images or the projected image is normalized. The articulated object can be deformed or projected on the image by a general-purpose computer graphic software.

Further, as another method, when the poses is obtained by actually moving the articulated object by the use of the general-purpose motion capture system, an image is obtained synchronously with an operation for obtaining the pose and the image can be used as the image information 7AB.

(2-2) Image Feature Calculating Part 71

An image feature calculating part 71 calculates feature vectors that describe the features of the articulated object in the image for all image information 7AB.

As the feature vectors, various vectors can be employed. As the feature vectors, is used a vector normalized by dividing an image into small areas and one dimensionally arranging a histogram of the small areas in the direction of an edge (Navneet Dalal and Bill Triggs, "Histograms of Oriented Gradients for Human Detection," Proc. of Computer Vision and Pattern Recognition, Vol. 2, pp. 886-893, 2005) or a spherical coordinate histogram of a silhouette profile (Shape Context) (Ankur Agarwal and Bill Triggs, "Recovering 3D Human Pose from Monocular Images," IEEE Transactions on Pattern Analysis & Machine Intelligence, No. 1, Vol. 28, 2006).

(2-3) Tree Structure Generating Part 72

In a tree structure generating part 72, the tree structure of the pose is formed so that the difference between the poses that belong to the nodes is the smaller in the lower layer of the tree structure.

When the pose vector is represented by the Euler angles, the pose vector can be defined as a maximum value of the difference of absolute values of elements of, for instance, two pose vectors Xa and Xb, that is, the maximum value of the difference of absolute values of rotating angles of articulate angles.

When the pose vector is represented by the quaternion, the absolute value of a rotating component of a quaternion $Xa^{-1} Xb$ can be used.

When the pose vector is represented by the three dimensional position, an Euclid distance between the two pose vectors Xa and Xb can be used as the difference of the poses.

Now, a procedure for generating the tree structure will be described below.

(2-3-1) Uppermost Layer Generating Step

An uppermost layer as a base of the tree structure is set to a present layer to form one node. In this node, all pose vectors are registered.

(2-3-2) Lower Layer Moving Step

The present layer is moved to a layer lower by one than the present layer.

(2-3-3) Finish Step

When the present layer exceeds the prescribed number of maximum hierarchies, the generation of the tree structure is finished. For all nodes (refer them to as parent nodes) of layers higher than the present layer, below-described processes are repeated.

(2-3-4) Clustering Step

The pose (refer it to as a parent pose) registered to a certain parent node is classified into k clusters by a clustering method such as a k-means algorithm. For the clustering algorithm, various methods may be used. Since a relation between the image feature vector and the pose vector is approximated by the mapping function in accordance with a regression analysis for the node of a lowermost layer, a clustering operation needs to be carried out so as to obtain an adequately high approximate accuracy. A detail of this operation will be described in a regression analysis part 74 of an item (2-5).

(2-3-5) Cluster Attribute Calculating Step

A representative pose vector of the pose vectors belonging to the cluster and the range of the pose belonging thereto are calculated. As the representative vector, an average of the pose vectors belonging to the cluster can be used. As the range of the pose, a covariance matrix can be used. When the pose vector is represented by the Euler angles or the quaternion, the difference of the poses as defined in the item (2-3) is used to determine the pose vector in which the average value of the differences from other pose vectors is the smallest as the representative vector. As for the range, the difference of the poses as defined in the item (2-3) is used and the mean square of the difference may be used in place of the covariance matrix.

(2-3-6) Node Generating Step

The nodes are formed respectively for the clusters. The poses belonging to the clusters are respectively registered in the node. Further, the formed nodes are connected to the parent nodes.

(2-3-7) Finish Control Step

When the processes of all the parent nodes are not completed, a next parent node is selected to return to the clustering step (2-3-4). When the processes of all the parent nodes are completed, the procedure returns to the lower layer moving step (2-3-2).

(2-4) Discriminative Surface Learning Part 73

In a certain node of a layer higher than the lowermost layer, a discriminative surface as the discriminative function for deciding whether or not an arbitrary image feature vector belongs to the node is learned as described below.

A label of "positive" is given to the feature vector obtained from the pose vector belonging to the node for which the discriminative surface is learnt and a label of "negative" is given to the feature vector obtained from the pose vector belonging to other node located in the same layer.

These sets of the feature vector and the label are determined to be the training samples for learning the discriminative surface. An existing two class classification method is applied to the obtained training sample to learn the discriminative surface. As the classification method, may be used various methods such as a support vector machine, Relevance Vector Machine (Tipping, M. E. "Sparse Bayesian Learning and the relevance vector machine," Journal of Machine Learning Research 1, 211-244, 2001), an orthogonal subspace space method, etc.

(2-5) Regression Analysis Part 74

For the node of the lowermost layer, a relation between the pose vector belonging to the node and the image feature vector is approximated by the mapping function in accordance with the regression analysis. Namely, in the regression analysis, a set of training samples is used that includes the pose vector as a dependent variable (an object variable) and the image feature vector as an independent variable (an explanatory variable) as a sample. As a method of the regression analysis, an existing method can be used. The relation between the pose vector and the image feature vector is complicated and unknown, however, the mapping function can be obtained by using a support vector regression or Relevance Vector regression (Tipping, M. E. "Sparse Bayesian learning and the relevance vector machine," Journal of Machine Learning Research 1, 211-244, 2001)

In the tree structure generating part 72, when the lowermost layer is clustered, a clustering operation needs to be carried out so that an approximate accuracy is sufficiently high by the obtained mapping function. For this purpose, the poses are finely divided until the accuracy of the mapping function is adequately high. Further, when there are training samples whose image feature vectors are substantially the same and whose pose vectors are greatly different in the cluster, the pose vector as an output value of the mapping function outputs an intermediate value of the pose vectors of the training samples. Thus, the pose cannot be precisely estimated. Accordingly, the poses are finely divided into clusters until such training samples do not exist in the same cluster.

Further, after the poses are divided into the clusters, it is examined whether or not some of them can be merged with an adequately high accuracy of the mapping function. If the approximate accuracy is high after the merge, such clusters are merged to achieve an efficient clustering. In this case, the clusters are merged so that the training samples whose image feature vectors are substantially the same and whose pose vectors are greatly different do not exist in the merged clusters. By considering a load of a calculation during recognition, a linear function may be used as the mapping function. In this case, the clusters of the poses are divided and merged until the accuracy of approximation is sufficiently high.

(3) Data Structure of Pose Dictionary A

Addresses are respectively assigned to the nodes of the tree structure. In each of the nodes, the representative pose vector and the range of the pose and addresses of nodes (refer them respectively to as a parent node and a child node) connected to the upper hierarchies and the lower hierarchies are stored. In the nodes of the upper layers except the lowermost layer, the discriminative surfaces are stored. In the node of the lowermost layer, the mapping function is stored. The pose dictionary A indicates a set of data related to all the nodes.

Figure 3:
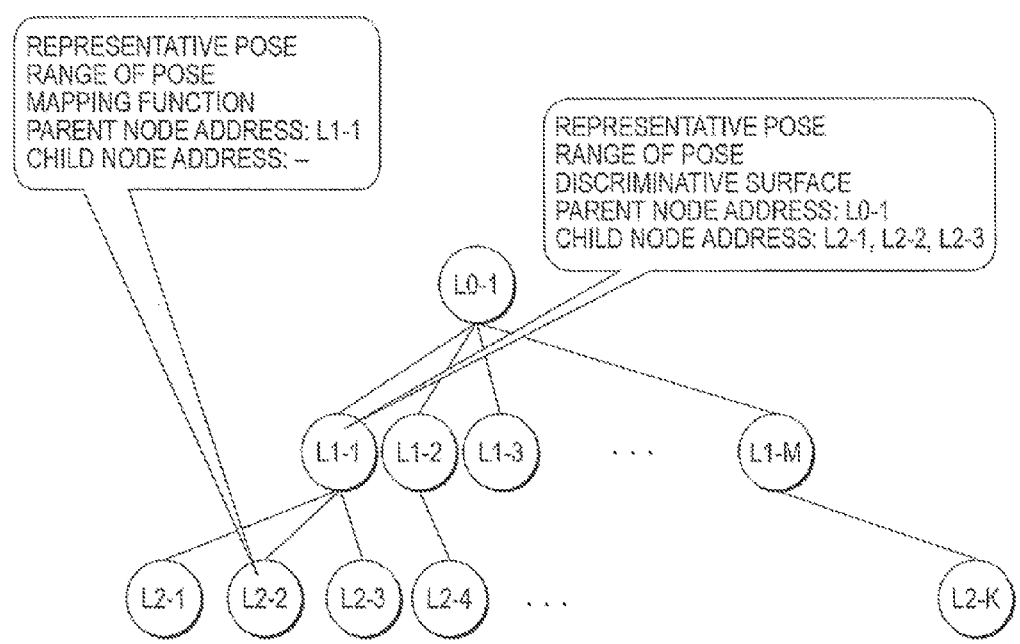
FIG. 3 is an explanatory view of a method for storing data registered in a pose dictionary A.

FIG. 3 is an example of data structure of a pose dictionary A. The pose dictionary A is a data having a structure of a tree of nodes. The nodes includes leaf nodes (L2-1, L2-2, ..., L2-K) and non-leaf nodes (L0-1, L1-1, L1-2, ..., L1-M). The non-leaf nodes include a root node (L0-1). The leaf nodes have no child node. The each non-leaf node has child nodes. The root node has no parent node. The each node has a pose information including a representative pose vector and the range of the pose. The pose information of the each node is covered by the pose information of its parent node. The each non-leaf node has a discriminative function representing the discriminative surface. The each leaf node has the mapping function.

The tree of the nodes is searched from the root node to the leaf nodes. It is determined using the discriminative function of the each non-leaf node whether its child nodes are searched or not.

(4) Pose Estimating Method

An explanation will be given to a method for estimating the pose from the image of the articulated object obtained from a camera by using the pose dictionary A.

(4-1) Image Pick-Up Part 1

The image pick-up part 1 in FIG. 1 is formed with one camera, shoots an image of the articulated object and transmits the image to the image feature extracting part 2.

(4-2) Image Feature Extracting Part 2

The image feature extracting part 2 calculates the image feature vector of the image obtained from the image pick-up part 1 like the image feature calculating part 71.

(4-3) Pose Predicting Part 3

The pose predicting part 3 predicts the pose of the present frame by using a motion model from an estimated pose in the previous frame.

The prediction of the pose can be represented in the form of a probability density distribution. A state transition probability density that a pose (an articulate angle) $X_{t-1}$ in the previous frame becomes a pose $X_t$ in a present frame can be described by $p(X_t|X_{t-1})$. To determine a motion model corresponds to determine the probability density distribution. The simplest motion model is a normal distribution having a constant covariance matrix in which the pose of a previous frame is previously determined to be an average value.

$$p(X_t|X_{t-1})=N(X_{t-1},\Sigma)$$ [Equation 1]

Here, $N(\ )$ indicates the normal distribution. Namely, the motion model has a parameter for determining a representative value of a pose to be predicted and a parameter for determining a range allowable for the pose to be predicted. In the case of the equation 1, the parameter for determining the representative value is a constant 1 as a coefficient of $X_{t-1}$. The parameter for determining the range allowable for the pose to be predicted is a covariance matrix $\Sigma$.

Otherwise, may be exemplified a method for linearly predicting the average value by setting the speed between successive frames to be constant or a method for predicting the average value by setting an acceleration to be constant.

(4-4) Upper Layer Classification Part 4

The upper layer classification part 4 uses the predicted result of the pose by the pose predicting part 3 and the image feature vector extracted by the image feature extracting part 2 and refers to the tree structure for the nodes belonging to other layers than the lowermost layer of the tree structure stored in the pose dictionary A to estimate a present pose.

Figure 4:
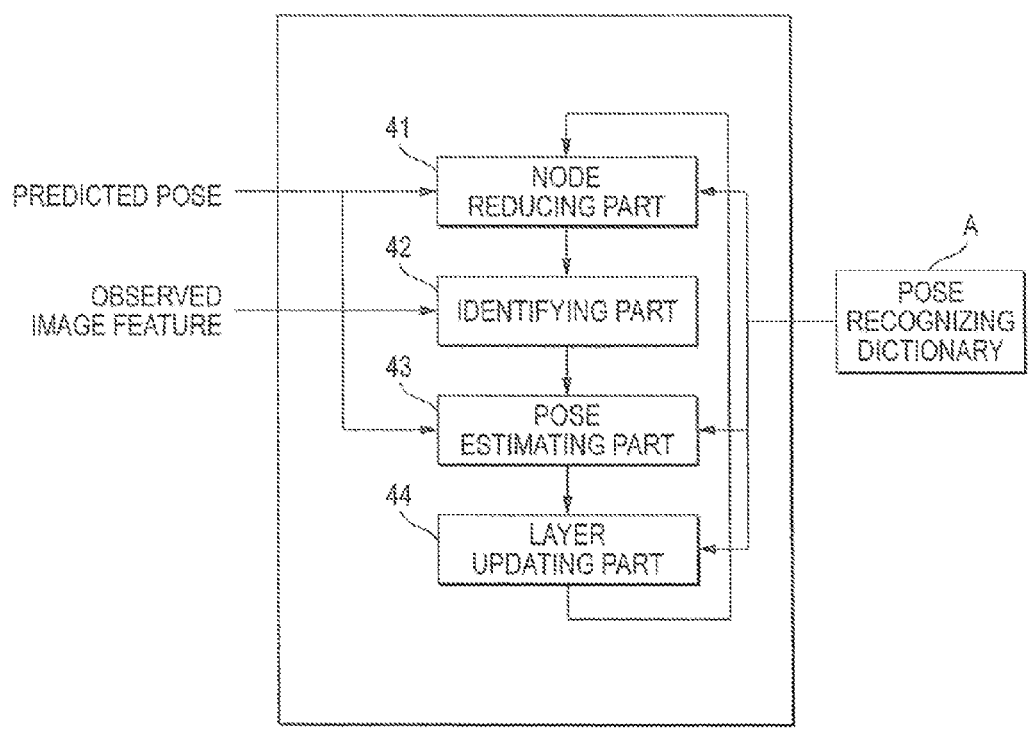
FIG. 4 is a block diagram showing the structure of an upper layer classification part.

FIG. 4 shows the structure of the upper layer classification part 4.

(4-4-1) Node Reducing Part 41

A node reducing part 41 uses the predicted pose of the pose predicting part 3 to obtain a prior probability that the representative pose vectors of the nodes respectively become the pose vector of the present frame. When the previous probability is adequately low, a below-described calculation is not to be carried out. Further, when the probability of the estimated result of the pose of the present frame (calculated in a pose estimating part 43) is obtained in a layer higher by one layer, the below-described calculation is not to be carried out for the node of the present layer connected to a node in which the probability is adequately low.

(4-4-2) Identifying Part 42

An identifying part 42 carries out two-class classification by using the image feature vector calculated in the image feature extracting part 2 and the two class discriminative surface stored in the pose dictionary A. with respect to the nodes which are selected in the node reducing part 41. An identifying method corresponding to a learning method used in the discriminative surface learning part 73 is employed.

In order to recognize a translation of a person to be recognized in a three dimensional space, the classification is carried out with respect to various positions and scales around the estimated position and scale in the previous frame. A movement of the position on the image corresponds to a movement in the three dimensional space in the direction parallel to the image plane and the change of the scale corresponds to a translation in the direction of an optical axis.

In a method by which a probability that an observed image feature vector belongs to the node can be calculated like Relevance Vector Machine, this probability is used as a likelihood (assuming that a present pose belongs to a certain node, a likelihood of an observation obtained from a camera). Otherwise, a likelihood function is previously set to a distance from the discriminative surface and a distance of the observed image feature vector from the two class discriminative surface is substituted for the likelihood function to obtain the likelihood.

(4-4-3) Pose Estimating Part 43

In a pose estimating part 43, a posterior probability that a present pose represented by a feature vector calculated in the Image feature extracting part 2 belongs to each node is calculated using a Bayesian inference from the prior probability of the node and the likelihood. The distribution of the posterior probability indicates the estimated result of the current layer.

(4-4-4) Layer Updating Part 44

Finally, in a layer updating part 44, when the current layer does not reach the lowermost layer, a process shifts to a layer lower by one layer. When the current layer reaches the lowermost layer, the estimation of the pose is completed.

(4-5) Lower Layer Regression Part 5

The lower layer regression part 5 estimates a present pose of the node belonging to the lowermost layer of the tree structure stored in the pose dictionary A by using the image feature vector extracted by the image feature extracting part 2 and the mapping function stored in the node. A continuity of the pose in time is also considered by using the predicted result of the pose by the pose predicting part 3.

Figure 5:
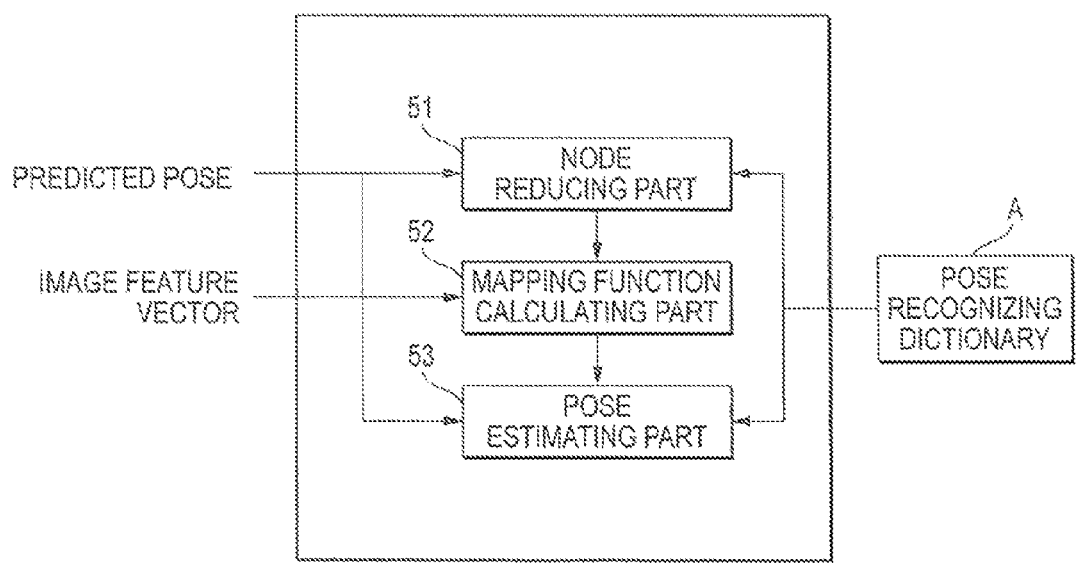
FIG. 5 is a block diagram showing the structure of a lower layer regression part.

FIG. 5 shows the structure of the lower layer regression part 5.

(4-5-1) Node Reducing Part 51

A node reducing part 51 is the same as the node reducing part 41 of the upper layer classification part 4.

(4-5-2) Mapping Function Calculating Part 52

A mapping function calculating part 52 calculates the pose by using the image feature vector calculated in the image feature extracting part 2 and the mapping function stored in the pose dictionary A for the node selected by the node reducing part 51. A recognizing method corresponding to a regression analysis method used in the regression analysis part 74 is employed.

When a probability that an estimated pose calculated from an observed image feature vector by the mapping function is a present pose can be calculated as in a Relevance Vector Machine, this probability is used as a likelihood.

(4-5-3) Pose Estimating Part 53

In a pose estimating part 53, a posterior probability that a present pose represented by a feature vector calculated in the Image feature extracting part 2 is a current pose is calculated using a Bayesian inference from the prior probability of the node and the likelihood. The distribution of the probability indicates the estimated result of the current layer.

(4-6) Estimated Result Output Part 6

The pose vector of an articulate angle that is the estimated result of the lowermost layer with the highest probability is outputted as a present estimated value.

The pose estimating device of this embodiment is constructed as described above, so that the pose of a human body can be efficiently estimated in a stable way.

(5) MODIFIED EXAMPLES

The present invention is not limited to the above-described embodiments and can be variously changed without departing from the gist thereof.

The number of cameras is not limited to one and a plurality of camera may be used.

In this case, the image pick-up part 1 is formed with the plurality of cameras. Accordingly, the image feature extracting part 2 carries out processes respectively to the images of the cameras. The image information 7AB is also composed of the images to the plurality of cameras. The image feature vector is a vector obtained by connecting the image feature vectors respectively calculated by the cameras.

(6) Effects

According to this embodiment, in the nodes respectively forming the upper hierarchies of the tree structure of the pose, the training data of various sizes, length and surface configurations is used to learn the two class discriminative surface for discriminating whether or not the pose belongs to the node. The observed image feature is identified by using the two class discriminative surface so that a recognition hardly affected by the change of the form of the articulated object can be realized. Further, the present pose is predicted by using the past pose estimated result and the motion model, and a node greatly different from the prediction is not used for pose estimation. Thus, a calculation can be reduced and an estimation can be temporally consistent.

In the lower layer of the tree structure, to recognize a fine pose, the poses need to be finely divided into clusters and a two class identification needs to be carried out in many nodes. Thus, amount of calculation increases. Thus, in this embodiment, the nodes are formed so that the poses respectively belonging to the nodes of the lowermost layer are adequately local. The poses respectively belonging to the nodes and the image features thereof are used to learn the mapping function from the image feature information to the pose information. The observed image feature obtained form the image pick-up part is transformed by the mapping function to directly estimate the pose. Thus, the pose can be efficiently estimated. In learning the mapping function, the training data of various sizes, length and surface configurations is respectively used in the nodes to learn the mapping function hardly influenced by the such variations.

Since the plurality of poses has the substantially same image feature, it is difficult to learn the mapping function in all the space of the pose. However, in this embodiment, since the poses belonging to one node of the lower layer of the tree structure is adequately local to avoid such a situation, an accurate mapping function can be obtained.

In the lower layer where the pose is estimated by using the mapping function, the present pose is predicted by using the past pose estimated result and the motion model and a node greatly different from the prediction is not used for pose estimation as in the upper layer. Thus, a calculation can be reduced and, furthermore, an estimation can be temporally consistent.

According to the above-described structure, the pose estimating device of a human body can be realized that is hardly influenced by elements such as the length, thickness of links or the surface configuration of the articulated object irrespective of the pose.

What is claimed is:

1. A pose estimating device comprising:
    a dictionary memory configured to store a pose dictionary that includes:
        training pose information related to various poses of an articulated object,
        a tree structure of poses that consists of layered nodes, wherein similarity among the training pose information belonging to a lower node is higher than similarity among the training pose information belonging to an upper node,
        a two class discriminative function for each node in upper layers that is upper than the lowermost layer in the tree structure, which determines on the basis of the training pose information and training image feature information whether or not a pose represented by image feature information belongs to the respective node, where the training image feature information is obtained by capturing virtual images of the articulated object of various sizes and various surface shapes each relating to the training pose information, and
        a mapping function for each node of the lowermost layer in the tree structure, which transforms image feature information into pose information on the basis of the training image feature information and the training pose information belonging to the nodes;

an image feature extracting unit configured to extract observed image feature information from an image of the articulated object;

a past information storing unit configured to store past pose estimating information of the articulated object;

a pose predicting unit configured to predict a present pose on the basis of the past pose estimating information and a predetermined motion model;

a node predicting unit configured to calculate a prior probability as to whether or not each nodes in respective layers of the tree structure includes a pose of a correct solution corresponding to the present pose based on the predicted pose;

a two class identifying unit configured to calculate a likelihood of the observed image feature information for each node in the upper layers by using the two class discriminative function stored in the node;

a node probability calculating unit configured to calculate a probability in which the pose of the correct solution is in the node in the upper layers from the prior probability and the likelihood; and a pose estimating unit configured to calculate pose information with respect to the lowermost layer by transforming the observed image feature information by the mapping functions stored in the pose dictionary.

2. The device according to claim 1, further comprising:
a two-class discriminative function learning unit configured to learn the two class discriminative function for each node in the upper layers using a set of sample data;
wherein the set of sample data consists of positive samples of the training image feature information whose corresponding training pose information belongs to the node of the two-class discriminative function to be learned and negative samples of the training image feature information whose corresponding training pose information belongs to the other nodes in the same layer of the tree structure.

3. The device according to claim 1, further comprising:
a mapping function learning unit configured to learn the mapping function;
wherein the mapping function learning unit learns the mapping function in accordance with a regression analysis by considering the training pose information included in a certain node and the training image feature information as a set of correct sample data.

4. The device according to claim 3,
wherein the set of correct sample data includes plural sets of the training pose information belonging to the respective nodes of the lowermost layer and the training image feature information; and
wherein the training pose information of the respective nodes and the training image feature information are configured so that the plural sets of training pose information and the training image feature information do not include any two sets of the training pose information and the training image feature in which the training image feature information is similar to each other and the training pose information is greatly different from each other.

5. The device according to claim 3,
wherein the set of correct sample data includes plural sets of the training pose information belonging to the respective nodes of the lowermost layer and the training image feature information; and wherein the training pose information of the respective nodes and the training image feature information are configured so as to enable a relation between the training pose information and the training image feature information in the set of the correct sample data to be approximated by a linear function.

6. The device according to claim 1, further comprising:
a node reducing unit configured to determine a node for carrying out a calculation by the identifying unit and the pose estimating unit on the basis of the prior probability in the respective nodes and a probability that the pose of the correct solution is included in the respective nodes in the upper layer.

7. The device according to claim 1,
wherein the upper layer includes one or a plurality of layers.

8. The device according to claim 1,
wherein the tree structure is configured by the nodes corresponding to a set of the poses in which the similarity of the poses of the articulated object is larger than a threshold value, the threshold value set smaller as the layers get lower and set constant in the same layer; and
wherein the nodes of the respective layers are connected to the nodes in the upper layers having the largest similarity.

9. The device according to claim 1, wherein the pose information includes an articulate angle of each part of the articulated object.

10. A pose estimating method using a pose dictionary, wherein the pose dictionary includes:
training pose information related to various poses of an articulated object,
a tree structure of poses that consists of layered nodes, wherein similarity among the training pose information belonging to a lower node is higher than similarity among the training pose information belonging to an upper node,
a two-class discriminative function for each node in upper layers that is upper than the lowermost layer in the tree structure, which determines on the basis of the training pose information and training image feature information whether or not a pose represented by image feature information belongs to the respective node, where the training image feature information is obtained by capturing virtual images of the articulated object of various sizes and various surface shapes each relating to the learning pose information, and a mapping function for each node of the lowermost layer in the tree structure, which transforms image feature information into pose information on the basis of the training image feature information and the training pose information belonging to the nodes;

the method comprising:
setting up the pose dictionary;
extracting observed image feature information from an image of the articulated object;
storing past pose estimating information of the articulated object;
predicting a present pose on the basis of the past pose estimating information and a predetermined motion model;
calculating a prior probability as to whether or not each nodes in respective layers of the tree structure includes a pose of a correct solution corresponding to the present pose based on the predicted pose;

calculating a likelihood of the observed image feature information for each node in the upper layer by using the two class discriminative function stored in the node;

calculating a probability in which the pose of the correct solution is in the node in the upper layer from the prior probability and the likelihood; and calculating pose information with respect to the lowermost layer by transforming the observed image feature information by the mapping function stored in the pose dictionary.

* * * * *